(12) United States Patent
Hayashi

(10) Patent No.: US 11,135,727 B2
(45) Date of Patent: Oct. 5, 2021

(54) AUTONOMOUSLY ACTING ROBOT THAT PERFORMS A GREETING ACTION

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 461 days.

(21) Appl. No.: 16/045,760

(22) Filed: Jul. 26, 2018

(65) Prior Publication Data
US 2018/0333862 A1 Nov. 22, 2018

Related U.S. Application Data

(63) Continuation of application No. PCT/JP2017/010594, filed on Mar. 16, 2017.

(30) Foreign Application Priority Data

Mar. 28, 2016 (JP) .............................. JP2016-063466

(51) Int. Cl.
*B25J 13/08* (2006.01)
*B25J 9/16* (2006.01)
(Continued)

(52) U.S. Cl.
CPC ................ *B25J 13/08* (2013.01); *A63H 3/40* (2013.01); *A63H 11/00* (2013.01); *A63H 11/10* (2013.01);
(Continued)

(58) Field of Classification Search
CPC .......... A63H 3/40; A63H 11/00; A63H 11/10; A63H 13/005; A63H 2200/00;
(Continued)

(56) References Cited

U.S. PATENT DOCUMENTS 6,565,371 B1    5/2003   Watanabe
2002/0049515 A1   4/2002   Osawa
(Continued)

FOREIGN PATENT DOCUMENTS

EP    1860515 A2   11/2007
EP    1941411 B1   9/2011
(Continued)

OTHER PUBLICATIONS

Office Action in DE Application No. 112017001573.1, dated Dec. 14, 2018, 13pp.
(Continued)

*Primary Examiner* — Robert T Nguyen
*Assistant Examiner* — Dylan M Katz
(74) *Attorney, Agent, or Firm* — Hauptman Ham, LLP

(57) ABSTRACT

Empathy toward a robot is increased by the robot emulating human-like or animal-like behavior. A robot includes a movement determining unit that determines a direction of movement, an action determining unit that selects a gesture from multiple kinds of gesture, and a drive mechanism that executes a specified movement and gesture. When a user enters a hall, an external sensor installed in advance detects a return home, and notifies the robot via a server that the user has returned home. The robot heads to the hall, and welcomes the user home by performing a gesture indicating goodwill, such as sitting down and raising an arm.

15 Claims, 8 Drawing Sheets

(51) Int. Cl.
  *A63H 11/00* (2006.01)
  *A63H 3/40* (2006.01)
  *A63H 13/00* (2006.01)
  *A63H 11/10* (2006.01)
  *B25J 11/00* (2006.01)
  *G06N 3/00* (2006.01)

(52) U.S. Cl.
  CPC .......... *A63H 13/005* (2013.01); *B25J 9/1697* (2013.01); *A63H 2200/00* (2013.01); *B25J 11/001* (2013.01); *B25J 11/003* (2013.01); *B25J 11/0005* (2013.01); *B25J 11/008* (2013.01); *G06N 3/008* (2013.01)

(58) Field of Classification Search
  CPC ...... B25J 9/1697; B25J 9/1664; B25J 9/1666; B25J 9/0003; B25J 11/001; B25J 11/003; B25J 11/005; B25J 11/0015; B25J 13/08; B25J 13/086
  See application file for complete search history.

(56) References Cited

U.S. PATENT DOCUMENTS

| | | | | |
|---|---|---|---|---|
| 2002/0052672 | A1* | 5/2002 | Osawa | G06N 3/008 700/245 |
| 2003/0229474 | A1* | 12/2003 | Suzuki | G08B 13/19623 702/188 |
| 2004/0113777 | A1 | 6/2004 | Matsuhira et al. | |
| 2005/0091684 | A1 | 4/2005 | Kawabata et al. | |
| 2005/0113974 | A1 | 5/2005 | Doi | |
| 2005/0171640 | A1* | 8/2005 | Sabe | A63H 11/00 700/245 |
| 2007/0192910 | A1* | 8/2007 | Vu | B25J 9/0003 700/245 |
| 2008/0056933 | A1* | 3/2008 | Moore | A47L 11/30 422/1 |
| 2008/0201014 | A1 | 8/2008 | Sonoura | |
| 2013/0035790 | A1 | 2/2013 | Olivier, III et al. | |
| 2014/0074291 | A1* | 3/2014 | Emoto | B25J 5/007 700/258 |
| 2015/0088310 | A1 | 3/2015 | Pinter et al. | |
| 2015/0205298 | A1 | 7/2015 | Stoschek et al. | |
| 2017/0100842 | A1* | 4/2017 | Le Borgne | B25J 9/1694 |
| 2017/0120446 | A1* | 5/2017 | Veltrop | B25J 9/1661 |
| 2017/0244472 | A1* | 8/2017 | Saito | H04B 7/155 |

FOREIGN PATENT DOCUMENTS

| | | |
|---|---|---|
| EP | 2933065 A1 | 10/2015 |
| JP | 2000-323219 A | 11/2000 |
| JP | 2001-188551 A | 7/2001 |
| JP | 2004-34274 A | 2/2004 |
| JP | 2004-185080 A | 7/2004 |
| JP | 2005-63057 A | 3/2005 |
| JP | 2005-103722 A | 4/2005 |
| JP | 2006-35381 A | 2/2006 |
| JP | 2007-152442 A | 6/2007 |
| JP | 2009-45692 A | 3/2009 |
| JP | 2009-509673 A | 3/2009 |
| JP | 2011000681 A * | 1/2011 |
| JP | 2011-110644 A | 6/2011 |
| JP | 2011-224679 A | 11/2011 |
| JP | 2013-27937 A | 2/2013 |
| JP | 2016-22537 A | 2/2016 |
| WO | 00/67959 A1 | 11/2000 |

OTHER PUBLICATIONS

International Search Report in PCT/JP2017/010594, dated May 30, 2017, 4pp.
Office Action in JP Application No. 2017-554104, dated Dec. 12, 2017, 4pp.
Office Action in JP Application No. 2017-554104, dated Mar. 27, 2018, 8pp.
Office Action in DE Application No. 112017001573.1, dated Feb. 22, 2019, 13pp.
Written Opinion of the ISA in PCT/JP2017/010594, dated May 30, 2017, 11pp.
Office Action in CN Application No. 201780020480.X, dated Apr. 2, 2021. 26pp.

* cited by examiner

US 11,135,727 B2

AUTONOMOUSLY ACTING ROBOT THAT PERFORMS A GREETING ACTION

RELATED APPLICATIONS

The present application is a continuation of International Application No. PCT/JP2017/010594, filed Mar. 16, 2017, which claims priority from Japanese Application No. 2016-63466, filed Mar. 28, 2016, the disclosures of which application are hereby incorporated by reference herein in their entirety.

FIELD

The present disclosure relates to a robot that autonomously selects an action in accordance with an internal state or an external environment.

BACKGROUND

A human acquires various items of information from an external environment via sensory organs, and selects an action. There are times when an action is consciously selected, and times when an action is subconsciously selected. A repeated action becomes a subconscious action in time, and a new action remains in a consciousness region.

A human believes that he or she has a will to freely select an action by him or herself, that is, a freewill. That a human feels emotions of affection or enmity toward another person is because he or she believes that the other person also has a free will. A person who has free will, or at least an existence that can be supposed to have a free will, is also an existence that eases a person's sadness.

A reason a human keeps a pet is that the pet provides solace, rather than whether or not the pet is useful to the human. Exactly because a pet is an existence that to a greater or lesser degree creates an impression of having a free will, the pet can become a good companion to a human.

Meanwhile, for various reasons such as not being able to secure sufficient time to look after a pet, not having a living environment in which a pet can be kept, having an allergy, or hating the thought of being parted by death, there are many people who give up on keeping a pet. A robot that performs the role of a pet may provide people who cannot keep a pet with the kind of solace that a pet provides (refer to JP-A-2000-323219).

SUMMARY

Although robot technology has advanced swiftly in recent years, the technology has not produced a presence as a pet-like companion. The inventors believe that this is because people do not consider a robot as having a free will. A human, by observing an action such that it can only be thought that a pet has a free will, feels the existence of a free will in the pet, empathizes with the pet, and is given solace by the pet.

The inventors believe that if there were a robot that can emulate a human-like or animal-like action, in other words, a robot that can autonomously select a human-like or animal-like action, empathy toward the robot could be greatly increased.

Embodiments of the invention, having been contrived based on a recognition of the above description, has an object of providing action control technology for increasing empathy toward a robot.

An autonomously acting robot according to at least one embodiment of the invention includes a movement determining unit that determines a direction of movement, an action determining unit that selects a gesture from multiple kinds of gesture, a target detecting unit that detects an existence of a person in a monitoring area, and a drive mechanism that executes a specified movement and a gesture.

When an existence of a person in the monitoring area is detected, the movement determining unit sets a movement destination target point to the monitoring area, and the action determining unit selects an affectionate gesture defined as a gesture indicating good intentions toward a person when the robot reaches the target point.

An autonomously acting robot according to at least one embodiment of the invention includes a movement determining unit that determines a direction of movement, a drive mechanism that executes a specified movement, and a recognizing unit that recognizes an external environment from information detected by a sensor.

The recognizing unit includes an entrance specifying unit that specifies a place through which a person can pass in an indoor space as an entrance, and an existence determining unit that determines whether or not a person exists within a predetermined range from the specified entrance.

The movement determining unit is characterized by setting the specified entrance as a movement destination in response to a determination by the existence determining unit that a person exists within the predetermined range from the specified entrance.

An autonomously acting robot according to at least one embodiment of the invention includes a movement determining unit that determines a direction of movement, a drive mechanism that executes a specified movement, and a recognizing unit that recognizes an external environment from information detected by a sensor.

The recognizing unit includes an entrance specifying unit that specifies a place through which a person can pass in an indoor space as an entrance, and a path predicting unit that determines whether or not a person is moving in a direction toward the specified entrance.

In response to a determination that a person is heading toward the specified entrance, the movement determining unit instructs the drive mechanism to follow the person.

An autonomously acting robot according to at least one embodiment of the invention includes a movement determining unit that determines a direction of movement, a drive mechanism that executes a specified movement, and a recognizing unit that recognizes an external environment from information detected by a sensor.

When a new person is recognized by the recognizing unit in a spatial region in which a person can be recognized, the movement determining unit determines the direction of movement of the robot in a direction heading toward the new person.

According to embodiments of the invention, empathy toward a robot is easily increased.

DETAILED DESCRIPTION OF THE INVENTION

Figure 1A:
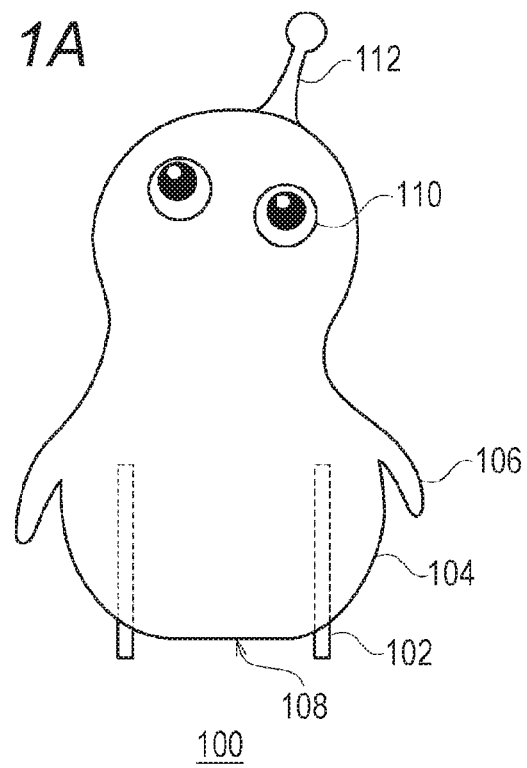
FIG. 1A is a front external view of a robot according to at least one embodiment.
Figure 1B:
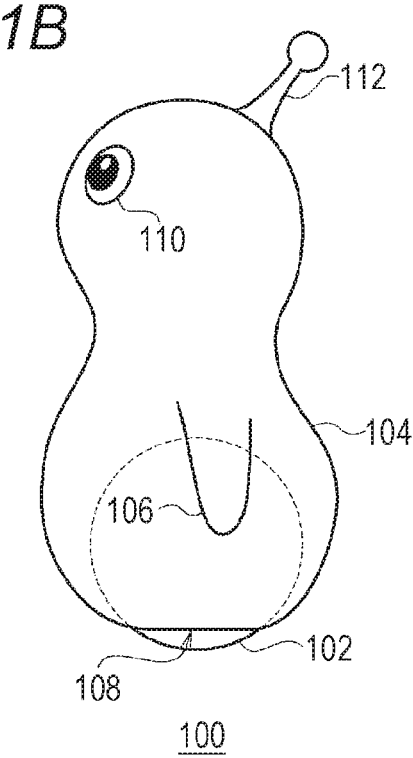
FIG. 1B is a side external view of the robot according to at least one embodiment.

FIG. 1A is a front external view of a robot 100. FIG. 1B is a side external view of the robot 100.

The robot 100 in at least one embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 of at least one embodiment has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and is formed of a soft material having elasticity, such as urethane, rubber, or resin. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less. In at least one embodiment, the total weight of the robot 100 is 10 kilograms or less. In at least one embodiment the total weight of the robot 100 is 5 kilograms or less. A majority of babies start to walk by themselves 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk unassisted.

An average weight of a baby less than 2 months afterbirth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is 1.2 meters or less. In at least one embodiment, the height of the robot 100 is 0.7 meters or less.

Being able to be held is a concept of the robot 100 in at least one embodiment.

The robot 100 moves using a wheel 102. A rotational speed and a direction of rotation of two of the wheel 102 can be individually controlled. Also, the wheel 102 can also be slid upward in an interior of the body 104 of the robot 100, and completely stored in the body 104. A greater portion of the wheel 102 is hidden by the body 104 when traveling too, but when the wheel 102 is completely stored in the body 104, the robot 100 is in a state of being unable to move (hereafter called a "sitting state"). In the sitting state, a flat seating face 108 is in contact with a floor surface.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone or an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
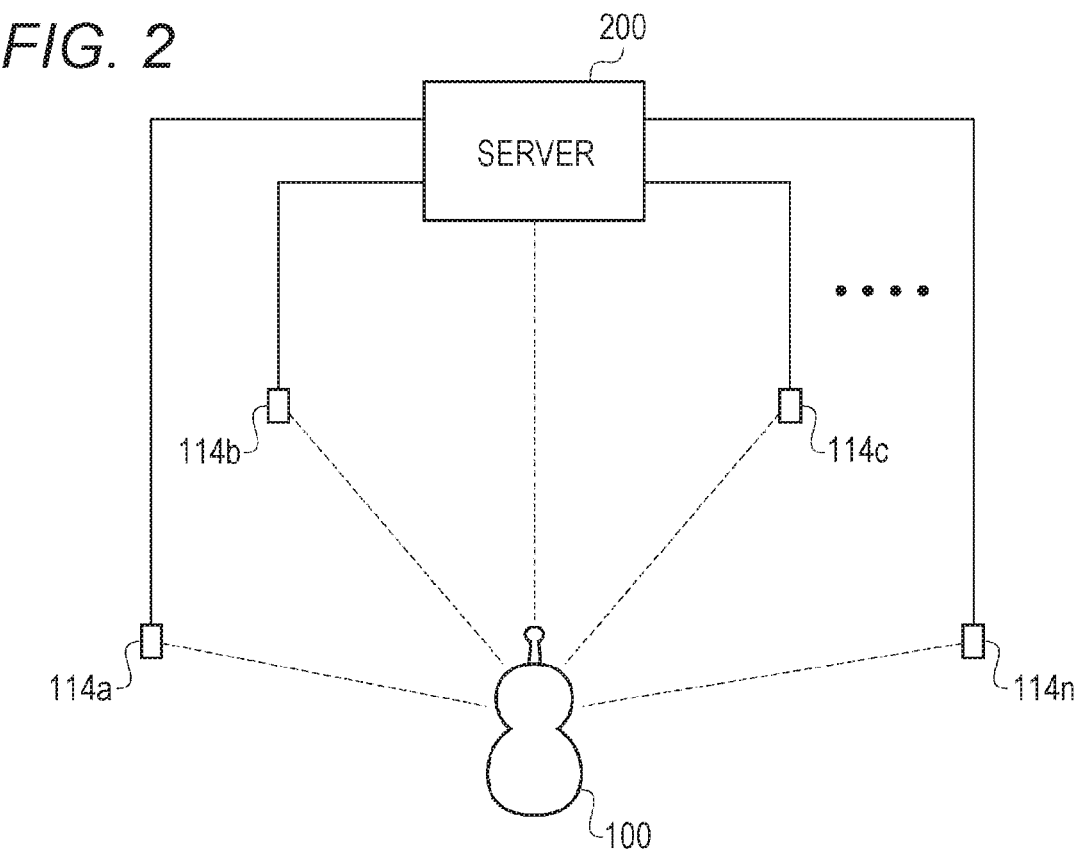
FIG. 2 is a configuration diagram of a robot system according to at least one embodiment.

FIG. 2 is a configuration diagram of a robot system 300.

The robot system 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in at least one embodiment correspond one-to-one. The server 200 determines a basic action of the robot 100 based on information obtained from the sensors incorporated in the robot 100 and the multiple of external sensors 114.

The external sensor 114 is for reinforcing sensory components of the robot 100, and the server 200 is for reinforcing processing power of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits positional coordinates to the server 200 may also be adopted.

A monitoring area is set for one portion or all of the external sensors 114. Further, a human (user) passing through the monitoring area is detected. In at least one embodiment, the external sensor 114 transmits a wireless signal (hereafter called a "user search signal") to a mobile device such as a smartphone possessed by the user in the monitoring area, and the mobile device of the user returns a wireless signal (hereafter called a "user response signal") including ID identifying the user (hereafter called "user ID"). The user response signal is sent to the server 200, and the server 200 recognizes which user is in a vicinity of the external sensor 114 based on the user response signal.

In this way, the external sensor 114 tracks positions of the robot 100 and the user. The user is identified by the user ID.

The external sensor 114 in at least one embodiment incorporates a highly directional microphone. The external sensor 114 can also pick up lifestyle noises and beckoning speech from a user using the highly directional microphone. Control corresponding to beckoning speech will be described in detail hereafter.

Figure 3:
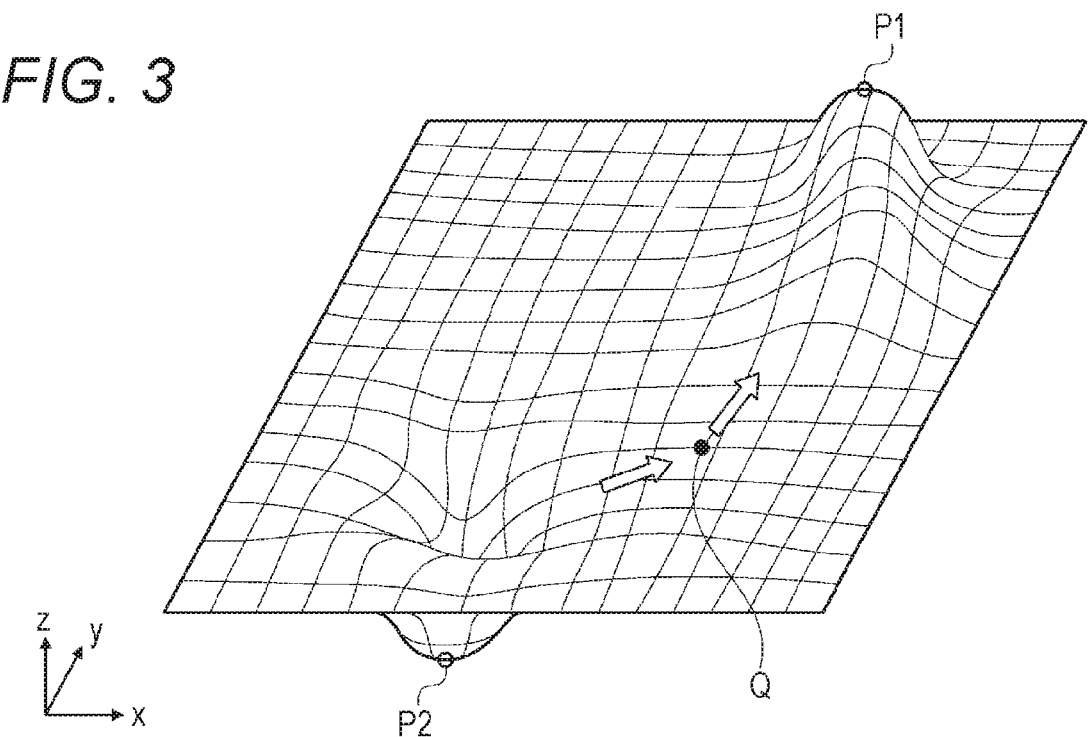
FIG. 3 is a schematic view of an emotion map according to at least one embodiment.

FIG. 3 is a schematic view of an emotion map 116.

The emotion map 116 is a data table stored in the server 200. The robot 100 selects an action in accordance with the emotion map 116. The emotion map 116 shown in FIG. 3 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 3, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but the favored place is generally a place that is favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but the disliked place is generally a place feared by small children, or by small animals such as dogs or cats, is set as a disliked point.

A coordinate Q indicates a current position of the robot 100. The server 200 identifies position coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

In at least one embodiment, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in at least one embodiment, the server 200 may calculate a distance moved by the robot 100 from the rotational speed of the wheel 102, thereby identifying the current position, or may identify the current position based on an image obtained from the camera.

When the emotion map 116 shown in FIG. 3 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 3. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a sadness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, a weighting coefficient of an action map that evaluates places in which curiosity is satisfied is set high.

Figure 4:
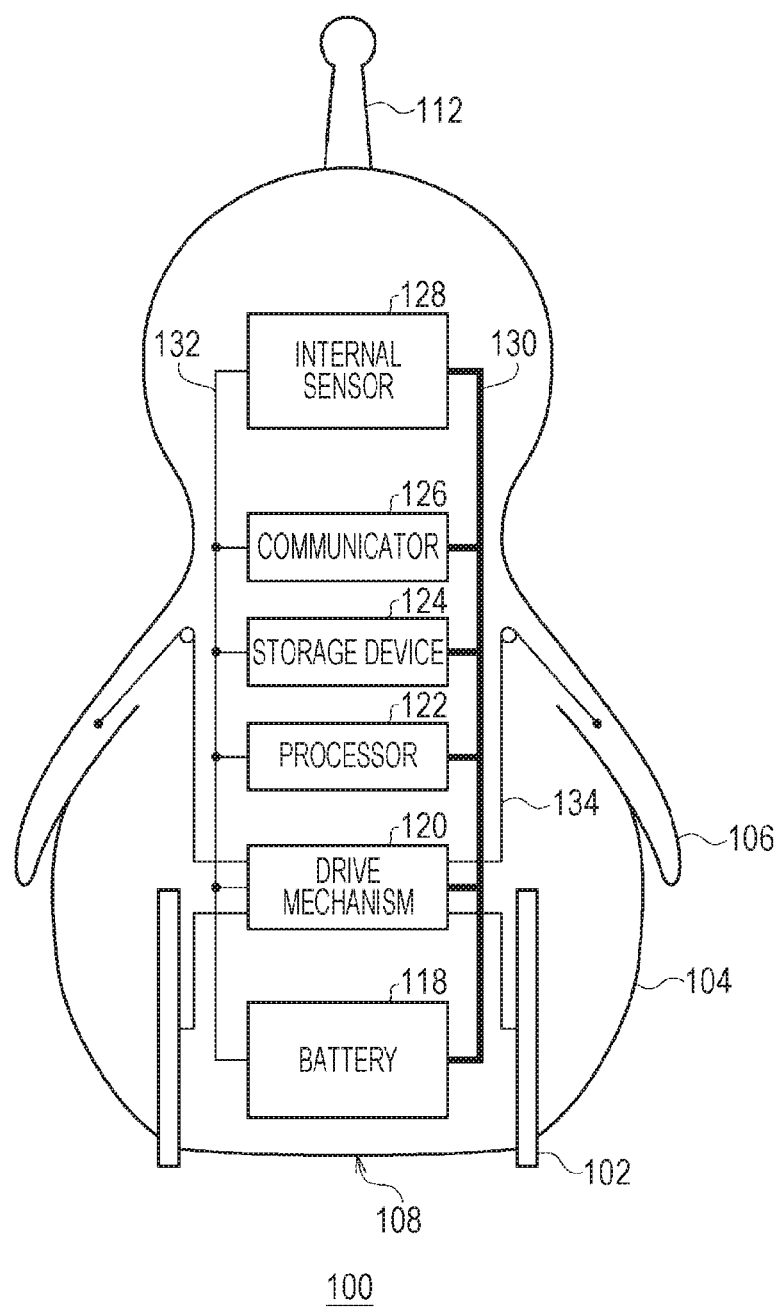
FIG. 4 is a hardware configuration diagram of the robot according to at least one embodiment.

FIG. 4 is a hardware configuration diagram of the robot 100.

The robot 100 includes an internal sensor 128, a communicator 126, a storage device 124, a processor 122, a drive mechanism 120, and a battery 118. The units are connected to each other by a power line 130 and a signal line 132. The battery 118 supplies power to each unit via the power line 130. Each unit transmits and receives a control signal via the signal line 132. The battery 118 is a rechargeable battery such as a lithium ion rechargeable battery, and is a power source of the robot 100.

The internal sensor 128 is a collection of various kinds of sensors incorporated in the robot 100. Specifically, the internal sensor 128 is one or more of a camera, a highly directional microphone, an infrared sensor, a thermosensor, a touch sensor, an acceleration sensor, a smell sensor, or the like. The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator, such as a motor, that controls various mechanisms, such as the wheel 102 and the arm 106.

In addition to this, an indicator, a speaker, and the like are also mounted in the robot 100.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel 102 and the arm 106. The drive mechanism 120 changes a direction of movement and a movement speed of the robot 100 by changing the rotational speed and the direction of rotation of each of the two wheels 102. Also, the drive mechanism 120 can also raise and lower the wheel 102. When the wheel 102 rises, the wheel 102 is completely stored in the body 104, and the robot 100 comes into contact with a floor surface via the seating face 108, taking on the sitting state.

The arm 106 can be lifted up by the drive mechanism 120 pulling the arm 106 via a wire 134. A gesture like an arm waving can also be performed by the arm 106 being caused to oscillate. A more complex gesture can also be represented by a large number of the wire 134 being utilized. That is, as the number of wires 134 in arm 106 complexity of possible gestures by arm 106 increases.

Figure 5:
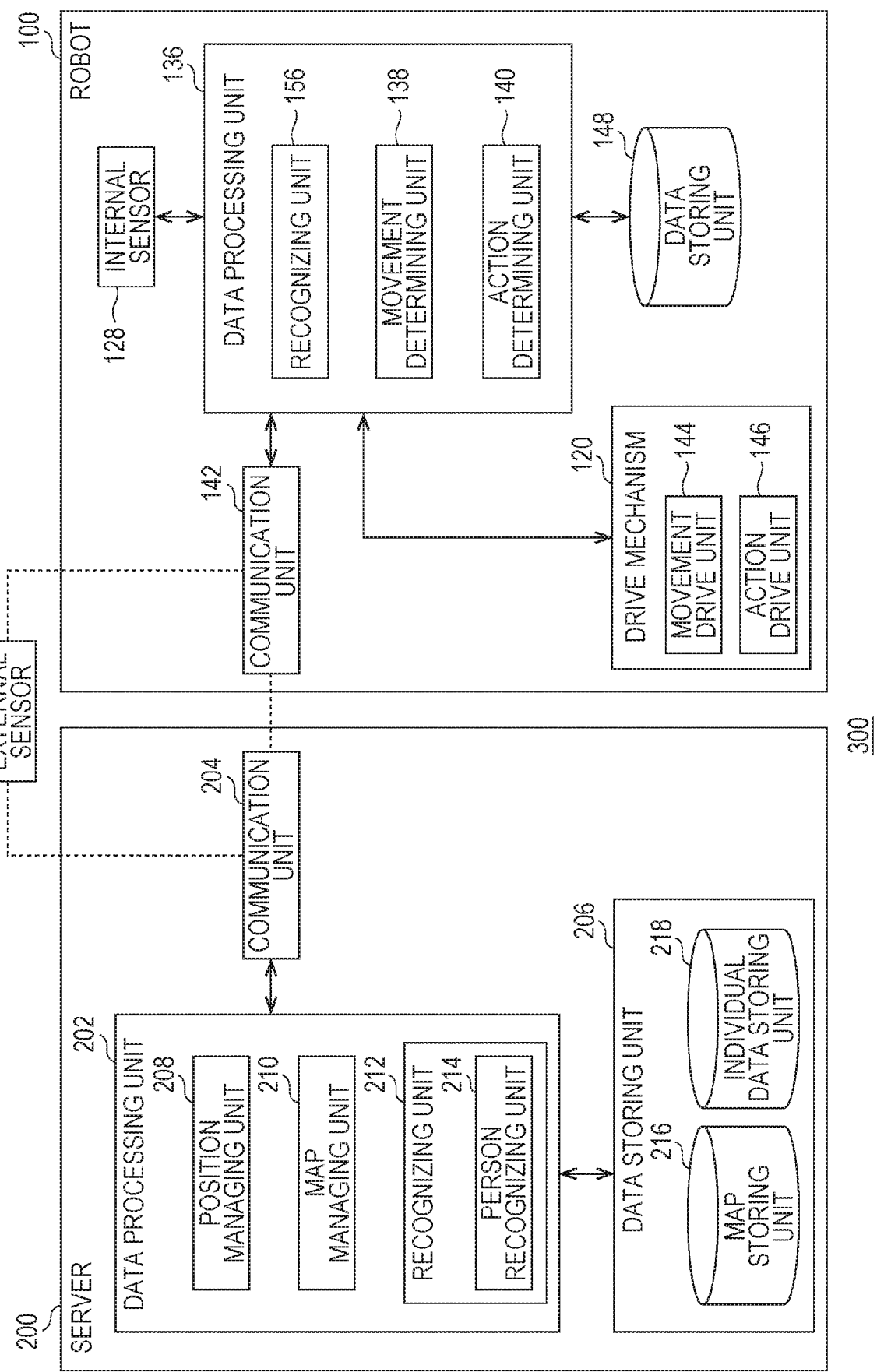
FIG. 5 is a functional block diagram of the robot system according to at least one embodiment.

FIG. 5 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206. The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a map storage unit 216 and an individual data storage unit 218. The map storage unit 216 stores a multiple of action maps. The individual data storage unit 218 stores information on a user, and in particular, on an owner. Specifically, the individual data storage unit 218 stores various kinds of parameter such as a user ID, familiarity, physical characteristics, and behavioral characteristics. The individual data storage unit 218 may also store attribute information such as age and gender.

The robot 100 acquires the user ID of a mobile terminal of a user, and identifies the user from the user ID.

The robot 100 may identify a user from the user's physical characteristics or behavioral characteristics. The robot 100 constantly films a periphery using the incorporated camera. Further, the robot 100 extracts the physical characteristics and behavioral characteristics of a person appearing in an image. The physical characteristics, specifically, may be visual characteristics inherent to a body, such as a height, a normal body temperature, clothes worn by choice, a presence or absence of spectacles, a skin gloss, a hair color, or may also include other characteristics such as an average body temperature, a smell, and a voice quality. The behavioral characteristics, specifically, are visual characteristics accompanying behavior, such as a place the user favors, a briskness of movement, and a presence or absence of smoking. For example, the robot 100 extracts characteristics such that a father (a user identified as such) is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information. Individual data of the clustered owners are registered in the individual data storage unit 218.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, and a recognizing unit 212. The position managing unit 208 identifies the positional coordinates of the robot 100 using a method relating to FIG. 2. Also, the position managing unit 208 also tracks positional coordinates of a user in real time.

The map managing unit 210 selects one of a multiple of action maps, and decides the direction of movement of the robot 100 based on the z value of the selected action map. The map managing unit 210 may also decide the direction of movement of the robot 100 by taking a weighted average of the z values of the multiple of action maps.

For example, the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214. The person recognizing unit 214 recognizes a person from an image filmed by the camera incorporated in the robot 100, and extracts the physical characteristics and behavioral characteristics of the person. Further, based on the physical characteristic information registered in the individual data storage unit 218, the person recognizing unit 214 determines what person, such as a father, a mother, or an eldest son, the person filmed, that is, the person the robot 100 is looking at, corresponds to.

Robot 100

The robot 100 includes a communication unit 142, a data processing unit 136, a data storing unit 148, a drive mechanism 120, and an internal sensor 128. The communication unit 142 corresponds to the communicator 126 (refer to FIG. 4), and manages a process of communicating with the external sensor 114 and the server 200. The data storing unit 148 stores various kinds of data. The data storing unit 148 corresponds to the storage device 124 (refer to FIG. 4). The data processing unit 136 executes various kinds of process based on data acquired by the communication unit 142 and data stored in the data storing unit 148. The data processing unit 136 corresponds to the processor 122 and a computer program executed by the processor 122. The data processing unit 136 also functions as an interface of the communication unit 142, the internal sensor 128, the drive mechanism 120, and the data storing unit 148.

The data processing unit 136 includes a recognizing unit 156, a movement determining unit 138, and an action determining unit 140.

The drive mechanism 120 includes a movement drive unit 144 and an action drive unit 146. The movement determining unit 138 decides a direction of movement of the robot 100. The movement drive unit 144 causes the robot 100 to head toward a target point by driving the wheel 102 in accordance with an instruction from the movement determining unit 138. The map managing unit 210 of the server 200 calculates a movement destination (target point) of the robot 100 in real time, based on an action map. The server 200 transmits the coordinates of the target point to the robot 100, and the movement determining unit 138 causes the robot 100 to move toward the target point.

Although an action map decides the main element of the direction of movement of the robot 100, the robot 100 of at least one embodiment can also carry out specific actions, those being "greeting" and "seeing off" a user. These will be described hereafter.

The action determining unit 140 decides a gesture of the robot 100. Multiple gestures are defined in advance in the data storing unit 148. Specifically, a gesture of sitting by housing the wheel 102, a gesture of raising the arm 106, a gesture of causing the robot 100 to carry out a rotating action by causing the two wheels 102 to rotate in reverse or by causing only one wheel 102 to rotate, a gesture of shaking by causing the wheel 102 to rotate in a state in which the wheel 102 is housed, and the like are defined.

The action determining unit 140 can also perform a gesture of holding up both arms 106 as a gesture asking for "a hug" when a user with a high degree of familiarity is nearby, and can also perform a gesture of no longer wanting to be hugged by causing the wheel 102 to rotate in reverse in a housed state when bored of the "hug". The action drive unit 146 causes the robot 100 to perform various gestures by driving the wheel 102 and the arm 106 in accordance with an instruction from the action determining unit 140.

The recognizing unit 156 analyzes external information obtained from the internal sensor 128. For example, when a strong force is applied to the robot 100, the recognizing unit 156 recognizes that a "violent action" has been performed by a user in the vicinity. When a user in a state of confronting the robot 100 speaks in a specific volume region and a specific frequency band, the recognizing unit 156 recognizes that a "beckoning action" has been performed with respect to the robot 100. Also, when a temperature in the region of body temperature is detected, the recognizing unit 156 recognizes that a "touching action" has been performed by a user, and when upward acceleration is detected in a state in which touching is recognized, the recognizing unit 156 recognizes that a "hug" has been performed. In this way, the recognizing unit 156 recognizes various kinds of response by a user toward the robot 100. "Pleasant" or "unpleasant" is correlated to these various kinds of action.

The recognizing unit 156 or the person recognizing unit 214 of the server 200 changes the familiarity toward a user in accordance with a response recognized by the recognizing unit 156. The familiarity toward a user who carries out a pleasant action increases, while the familiarity toward a user who carries out an unpleasant action decreases.

The map managing unit 210 of the server 200 may determine whether a response is pleasant or unpleasant in accordance with details thereof, and change the z value of the point at which the pleasant or unpleasant action has been carried out on an action map that represents "affection toward a place".

Greeting and Seeing Off Functions

Figure 6:
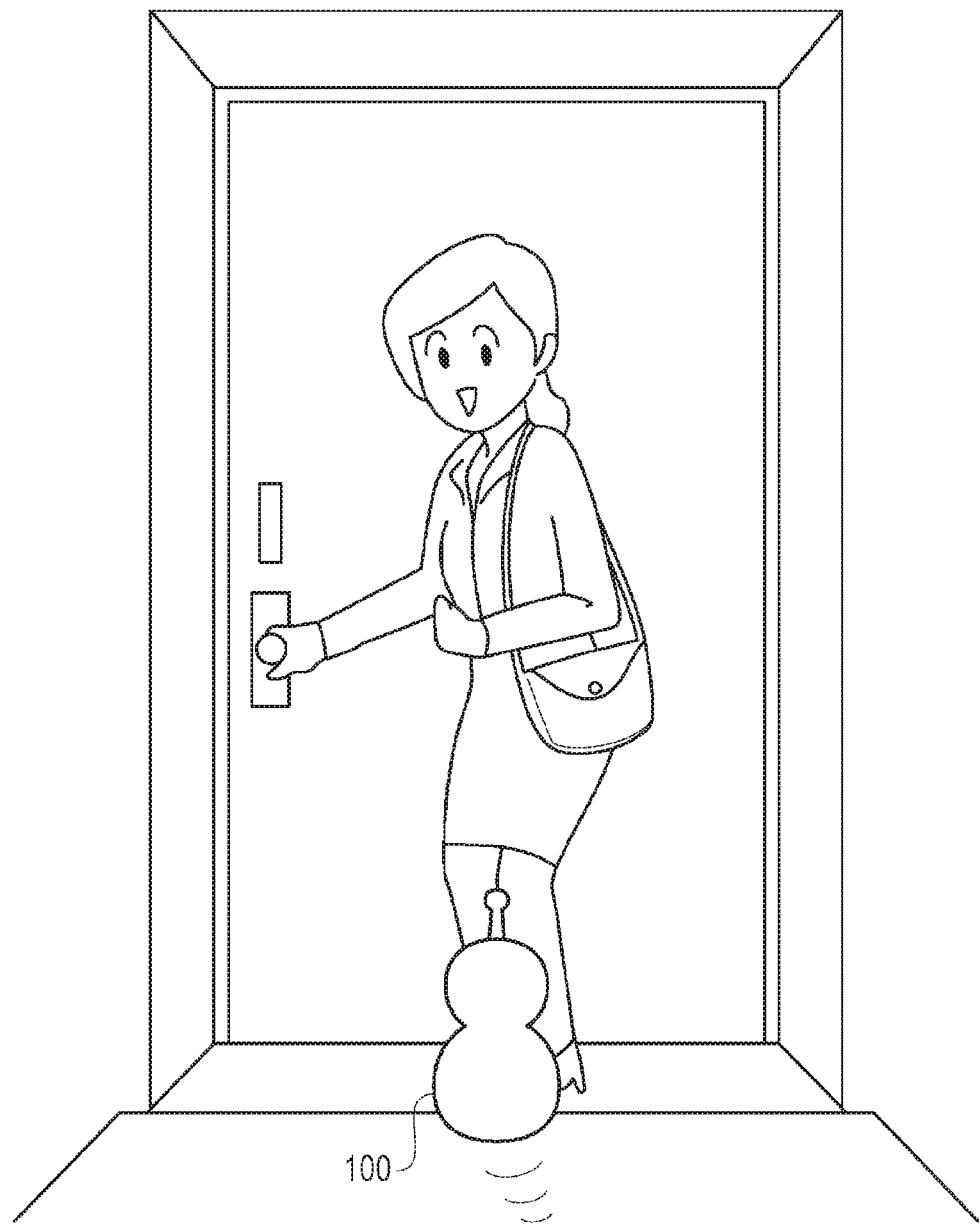
FIG. 6 is an image of a greeting by the robot according to at least one embodiment.

FIG. 6 is an image of a greeting.

In at least one embodiment, when the front door opens and a user returns home, the robot 100 greets the user in the hall. The robot 100 sits down in the hall, and performs the gesture of asking for a hug by raising both arms 106. Also, the robot 100 may express a feeling of pleasure at the user's return home by performing a rotating action in the hall. Alternatively, the robot 100 may emit a peculiar peeping "call" from the incorporated speaker.

When a user goes out, the robot 100 heads toward the hall to see the user off. At this time, the robot 100 expresses "see you" by raising one arm 106 and causing the arm 106 to oscillate. The robot 100 may also express with an action a feeling of sadness at the user going out by emitting a peculiar call.

In this way, when greeting or seeing off, the robot 100 heads toward the hall, and performs a gesture specified in advance and indicating a liking toward a person (hereafter called an "affectionate gesture").

Figure 7:
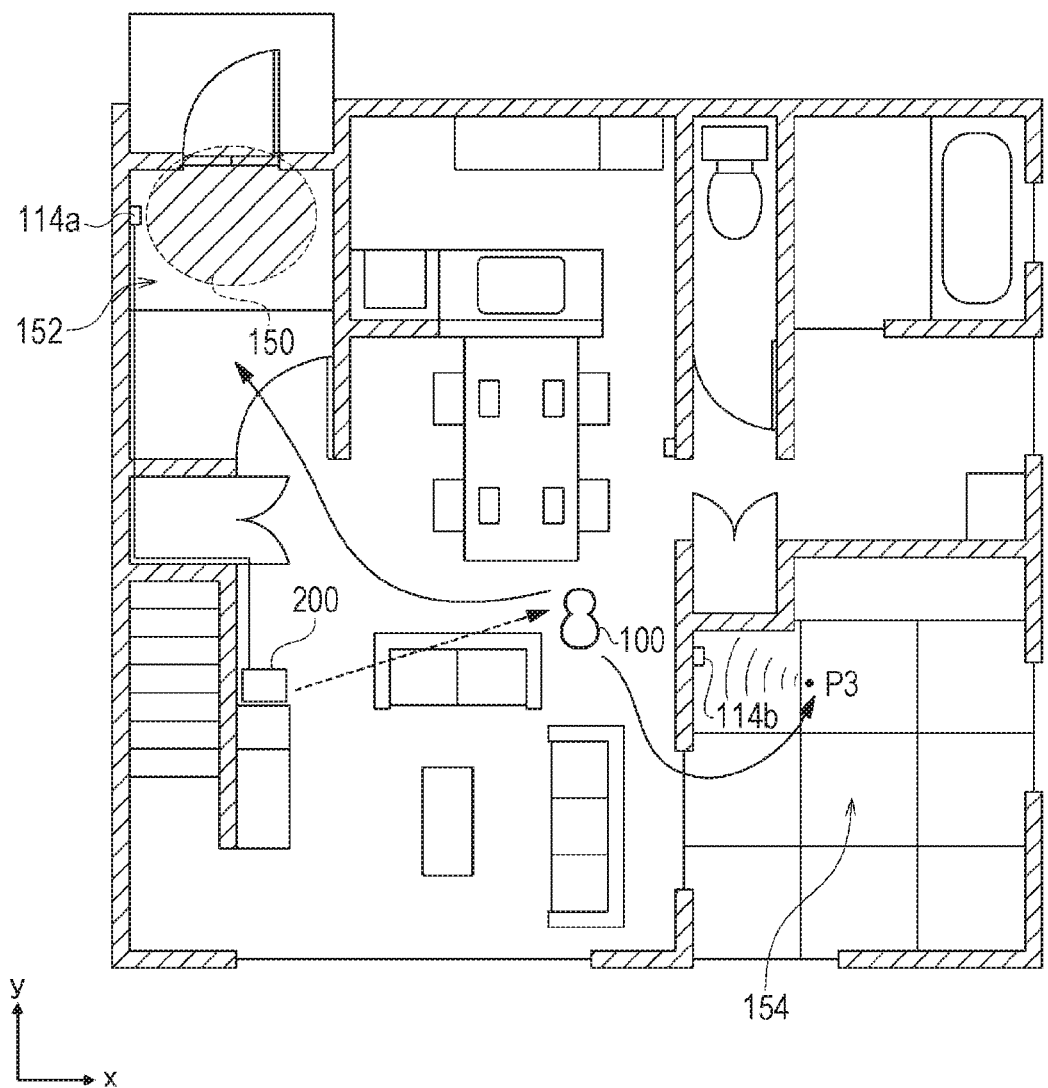
FIG. 7 is a schematic diagram for describing greeting and seeing off actions of the robot according to at least one embodiment.

FIG. 7 is a schematic diagram for describing the greeting and seeing off actions of the robot 100.

In at least one embodiment, the external sensor 114a is installed in advance in a hall 152. The external sensor 114a regularly, for example, at a frequency of once a second, transmits a user search signal to a monitoring area 150, which is a region peripheral to the external sensor 114a. When a user opens a door of the hall 152 and enters the monitoring area 150, a smartphone possessed by the user detects the user search signal, and returns a user response signal. User ID is included in the user response signal. On receiving the user response signal, the external sensor 114a transmits the user response signal to the server 200. In at least one embodiment, the external sensor 114a and the server 200 are connected by wire.

The external sensor 114, after detecting an unlocking sound of the door of the hall 152 or a sound of the door opening, may recognize a "return home" by detecting an entrance of a user into the monitoring area 150.

The server 200 transmits a control signal for instructing the robot 100 to carry out a greeting. The positional coordinates of a target point are specified by the control signal. On the communication unit 142 of the robot 100 receiving the control signal from the server 200, the movement determining unit 138 instructs the movement drive unit 144 to head toward the hall 152. A target point in an interior of the monitoring area 150 is set as the target point. The robot 100 confirms obstacles using the incorporated camera, and heads for the target point while avoiding the obstacles.

In addition to the target point, the server 200 may specify a route for the robot 100 to head from the current point to the target point to the robot 100.

The movement determining unit 138 of the robot 100 may set the positional coordinates specified by the server 200 as the target point without change or, when the server 200 issues an instruction for a greeting, the movement determining unit 138 may determine the target point independently.

On the robot 100 reaching the target point, the action determining unit 140 performs an affectionate gesture. One example of an affectionate gesture is a gesture of sitting at the target point, and raising both arms 106 as though to ask for a "hug". Owing to this kind of control, a user returning home recognizes that the robot 100 welcomes the user's return home, and that the user's going out makes the robot 100 feel sad. In this way, the user's empathy toward the robot 100 can be strengthened by the robot 100 performing a human-like or animal-like action.

Not only a greeting, but also a seeing off can be performed. When the external sensor 114a detects a user entering the monitoring area 150 from an indoor side, a seeing off is performed. Specifically, on the external sensor 114a receiving a user response signal from the indoor side of the monitoring area 150, the external sensor 114a transmits the user response signal to the server 200.

The server 200 transmits a control signal for instructing the robot 100 to carry out a seeing off. On the robot 100 receiving the seeing off instruction signal, the movement determining unit 138 instructs the movement drive unit 144 to head toward the hall 152. On the movement determining unit 138 setting a target point in the interior of the monitoring area 150, the robot 100 heads for the target point.

On the robot 100 reaching the target point, the action determining unit 140 performs an affectionate gesture for a seeing off. The robot 100 may sit at the target point and ask for a "hug", may randomly move around a periphery of the target point, or may wave goodbye by raising one arm 106.

In addition to a greeting and a seeing off, a "beckoning" can also be performed. When a user says beckoning words such as "come here" to the robot 100, the highly directional microphone incorporated in the robot 100 detects the speech, and when recognizing that the speech is beckoning words, the robot 100 moves toward the user. In this case, the robot 100 identifies the direction of the speech source, and sets a target point in that direction.

The beckoning words may be a number of typical words such as "come here" and "hoy", or may be a name of the robot 100.

However, in some instances, a beckoning of a user is difficult to detect by the highly directional microphone of the robot 100 amidst miscellaneous environmental noise. Also, when there is a considerable distance between a user and the robot 100, or when there is a sound blocking object such as a wall between a user and the robot 100, clearly detecting the beckoning words is difficult with the highly directional microphone incorporated in the robot 100. In some instances, although speech is of a degree that can be reliably heard by a human, the robot 100 has difficulty recognizing the speech, because of which, in at least one embodiment, "hearing" of the robot 100 is augmented using the external sensor 114.

For example, a user at a coordinate P3 in a Japanese style room 154 says beckoning words to the robot 100. In FIG. 7, there is a wall between the coordinate P3 and the current position of the robot 100, because of which the beckoning with the highly directional microphone of the robot 100 is difficult to detect.

The external sensor 114b is installed in the Japanese style room 154. A highly directional microphone is incorporated in the external sensor 114b. When a beckoning is vocalized at the coordinate P3, the external sensor 114b detects the speech, and transmits a speech signal to the server 200. The position managing unit 208 of the server 200 identifies a position of a user who is a speech source. Also, the recognizing unit 212 determines whether or not the speech is beckoning speech using speech recognition. As the external sensor 114b is near the user who is the speech source, the external sensor 114b acquires clear speech more easily than the robot 100.

When the recognizing unit 212 recognizes beckoning speech, the server 200 instructs the robot 100 to head toward the coordinate P3. On receiving the instruction signal, the robot 100 moves to the coordinate P3. Using this kind of control method, an action such that the robot 100 comes near when beckoned can be realized. Also, even when sufficient speech recognition cannot be carried out with the highly directional microphone incorporated in the robot 100, a beckoning action can be realized with the support of the external sensor 114.

Meanwhile, when the robot 100 and the speech source coordinate P3 are too far apart, the action of approaching the user in accordance with the beckoning (hereafter called an "approaching action") is not performed. This is because the robot 100 would not naturally always perform an approaching action even when a user far away from the robot 100 beckons. In at least one embodiment, an approaching action is carried out under a condition that a beckoning is carried out within a distance in a region such that a pet such as a dog or a cat can hear.

More specifically, when a user beckons, the server 200 estimates a distance from the external sensor 114 that detects the beckoning to the speech source (user), and from that, further estimates a distance from the speech source to the robot 100. When the distance is equal to or greater than a predetermined distance, the server 200 does not instruct the robot 100 to perform an approaching action.

When a user beckons, the microphone incorporated in the robot 100 also picks up the speech. Even when the speech is not clear, the robot 100 is deemed to have "heard" provided that some kind of speech is picked up. Therefore, provided that the server 200 recognizes beckoning speech via the external sensor 114, and the robot 100 can detect some kind of speech at the same timing, the server 200 may instruct the robot 100 to perform an approaching action. When the microphone incorporated in the robot 100 does not pick up speech when a beckoning is carried out, or when the volume of speech picked up is equal to or lower than a predetermined threshold, a determination is made that the robot 100 "didn't hear", and the server 200 does not instruct the robot 100 to perform an approaching action.

Consequently, when a user's voice is small, or when there is a sound blocking object such as a wall and hearing is difficult, an approaching action is not performed. Also, when the robot 100 is distanced from a sound source but a user's voice is loud, or when there is a sound blocking object such as a wall but the robot 100 is distanced only by an extent such that a voice can be heard, an approaching action is performed. Because of this, a hearing level of the robot 100 can be represented in the same way as that of a common animal.

Hereafter, the robot 100 and the robot system 300 including the robot 100 will be described, based on an embodiment.

The robot 100, in accordance with an action map or the like, performs an action selection that cannot be patterned using one or more action maps, and which is difficult to predict and animal-like.

The robot 100, in cooperation with the external sensor 114, detects a user passing through a predetermined region, typically the hall 152, and performs a seeing off or a greeting action in response to this. Also, in response to a beckoning, the robot 100 performs an approaching action within a range conceivable of an animal and not unnatural. Using this kind of method, a more animal-like action selection is emulated.

Affection toward a pet often arises from a feeling of being needed or relied on by the pet. A meeting action of greeting, sitting down on the spot, and asking for a hug when a user returns home, a seeing off action when a user goes out, and the like, are effective action selections for demonstrating that the robot 100 has a deep interest in the user. The same applies to an approaching action accompanying a beckoning.

Owing to a greeting, a seeing off, and a beckoning, for which a human often feels affection toward a pet, being realized with the robot 100 too, affection from a user toward the robot 100 can be strengthened.

The invention not being limited to the heretofore described at least one embodiment or a modified example, components can be changed or embodied without departing from the scope of the disclosure. Various implementations may be formed by a multiple of the components disclosed in the heretofore described at least one embodiment or the modified example being combined as appropriate. Also, some components may be eliminated from the total of components shown in the heretofore described at least one embodiment or the modified example.

Although a description has been given assuming that the robot system. 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 5 can also be comprehensively grasped as one "information processing device". In at least one embodiment, a method of distributing the multiple of functions needed in order to realize the invention with respect to one or multiple items of hardware is determined with consideration to the processing capability of each item of hardware, specifications required of the robot system 300, and the like.

In at least one embodiment, the recognizing unit 212 of the server 200 detects an existence of a user in the monitoring area 150 via the external sensor 114. In at least one example, the recognizing unit 156 of the robot 100 may detect an existence of a user in the monitoring area 150 via the external sensor 114 or the internal sensor 128.

Although the robot 100 need not necessarily identify a user, the robot 100 may change an action in accordance with the user. The robot 100 may correlate user ID and familiarity, perform a seeing off or meeting action when a user whose familiarity is of a predetermined threshold or higher returns home or goes out, and not perform such an action when the familiarity is lower than the threshold.

The robot 100 may regularly detect user ID from a mobile device such as a smartphone possessed by a user, and set familiarity so as to increase with respect to user ID detected with high frequency. Also, familiarity may be set so as to increase with respect to a user who performs a typical familiar action such as a hug. The robot 100 may sense contact when a user lifts up the body 104, or may recognize a performing of a hug by a load applied to the wheel 102 decreasing. Familiarity may gradually decrease with the passing of time. The robot 100 may recognize a violent action toward the robot 100 by detecting a force applied to the robot 100 using the acceleration sensor, and reduce the familiarity of a user who performs a violent action. When a user grasps the horn 112 and lifts the robot 100 up, the robot 100 may recognize this as a violent action.

The robot 100 may recognize a user from physical characteristics or behavioral characteristics of the user rather than from user ID. For example, when only one user among a multiple of users who should be an owner wears glasses, the robot 100 can distinguish between the user who wears glasses and the other users. Further, by allotting user ID=1 to the user who wears glasses, that user can be recognized. A user may be identified not only from glasses, but also from physical characteristics or behavioral characteristics such as height or a smoking action.

The external sensor 114 may be a human sensor that detects a person using infrared rays. A greeting or a seeing off action may be realized by the external sensor 114 transmitting a detection signal to the server 200 when detecting that a person passes through the hall 152. In this case, the external sensor 114 need not necessarily identify a user. The external sensor 114 may transmit a detection signal to the server 200 when detecting a sound of a door of the hall 152 opening, for example, an unlocking sound or a locking sound, using the incorporated highly directional microphone. In addition to this, the robot 100 may perform a seeing off or a greeting with a noise of a shoe cupboard opening, a noise of an umbrella being closed or opened, beckoning speech such as "see you later" or "I'm home", or the like as a trigger.

The robot 100 may identify the positional coordinates of the robot 100 by transmitting a search signal and receiving a response signal from each external sensor 114. Alternatively, the external sensor 114 may transmit a search signal with directivity, whereby the robot 100 may identify the distance and direction to the robot 100 from the external sensor 114.

The robot 100 may detect not only that a human passes through but also that an animal such as a cat or a dog passes through.

When the internal sensor 128 of the robot 100 is highly accurate, the external sensor 114 is not essential. Also, the server 200 may include a function of the external sensor 114. Provided that the internal sensor 128 of the robot 100 can detect an unlocking sound with high accuracy, the robot 100 can perform a greeting action even without the external sensor 114 or the server 200.

A multiple of the robot 100 may exchange information with each other. On a first robot 100 detecting a return home of a user, the first robot 100 notifies a second robot 100 of the return home by wireless communication, whereby the first and second robots 100 may perform a greeting action. The same applies to a seeing off.

Generally, a lifestyle pattern of each member of a family is practically fixed. For example, a father leaves home at around 6:30 in the morning, and returns home at around 9 o'clock in the evening. A child leaves home at around 7:50 in the morning, and returns home at around 3 o'clock in the afternoon. A daily lifestyle pattern is fixed in this way. The robot 100 further includes a lifestyle pattern accumulating unit in which the lifestyle patterns of each user are accumulated, and the movement determining unit 138 of FIG. 5 may perform an action based on the times of returning home and leaving home of each user registered in the lifestyle pattern accumulating unit. The lifestyle pattern accumulating unit may be formed as one portion of the data storing unit 206 of the server 200, or may be formed as one portion of the data storing unit 148 of the robot 100.

The robot 100 may move near the hall when the time at which one user returns home is near, and perform a gesture of waiting for the user to return home, for example, a sitting or a rotating movement. Also, when the time at which one user leaves home is near, the robot 100 may carry out tracking of the user with priority, promptly detect the user heading toward the hall, and perform an action of following the user.

The robot 100 may adjust a sensitivity of various kinds of sensor based on the accumulated lifestyle patterns. For example, when a time range of a return home is near, the robot 100 may increase the sensitivity (voltage amplification rate) of the microphone, and detect a sound of a hall door opening, or a sound of a gate outside the hall opening and closing. The robot 100 can meet or see off at a natural timing by predicting an action based on experience.

When another user S2 goes out in a situation in which the robot 100 is being hugged by a user S1, the robot 100 changes an action in accordance with the familiarity toward each user.

For example, when familiarity toward the user S2 who is going out is greater than that toward the user S1 who is hugging, the robot 100 moves so as to be released from the hug by performing a gesture of "no, no", specifically, an action of causing the wheel 102 to rotate in a state in which the wheel 102 is stored in the body 104, an action of causing the arm 106 to oscillate strongly, or the like. The robot 100 escapes from the hug, and sees the more familiar user S2 off as far as the hall.

When familiarity toward the user S2 who is going out is less than that toward the user S1 who is hugging, the robot 100 continues to be hugged, and waves the arm 106 lightly.

An affectionate gesture when greeting may be performed in stages. When first greeting, the robot 100 simply asks for a "hug" by raising the arm 106. When the robot 100 does not receive a hug, the robot 100 makes a user aware of the robot 100's existence by moving the arm 106 violently. When the robot 100 still does not receive a hug, the robot 100 may house the wheel 102 and not move unless the user provides a hug. When the robot 100 still does not receive a hug, the robot 100 may throw itself against the user, or may circle around the user.

Figure 8:
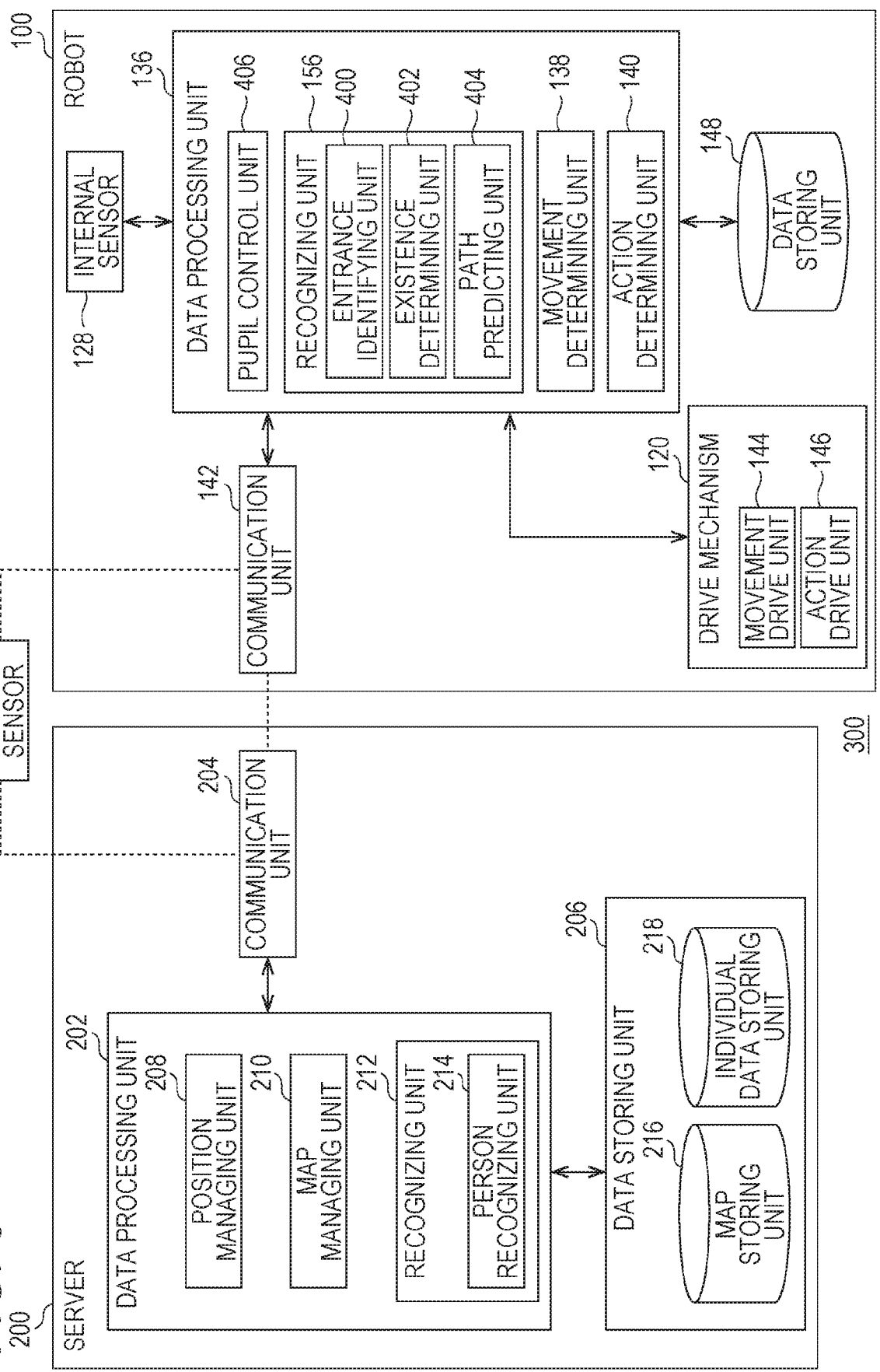
FIG. 8 is a functional block diagram of the robot system according to at least one embodiment.

FIG. 8 is a functional block diagram of the robot system 300.

In at least one embodiment, the data processing unit 136 of the robot 100 includes a pupil control unit 406. The recognizing unit 156 includes an entrance identifying unit 400, an existence determining unit 402, and a path predicting unit 404. The eye 110 of the robot 100 is a display on which a pupil image is shown. The pupil control unit 406 changes a position and size of the pupil image of the eye 110.

In at least one embodiment, the person recognizing unit 214 of the server 200 manages familiarity of the robot 100 toward a user for each user. When the robot 100 is subjected to a predetermined pleasant action such as being hugged by a user, the person recognizing unit 214 increases the familiarity toward that user. Meanwhile, when the robot 100 is subjected to a predetermined unpleasant action such as being hit by a user, the person recognizing unit 214 reduces the familiarity toward that user.

The entrance identifying unit 400 identifies an entrance in an indoor space. In at least one embodiment, an "entrance" in this case is an aperture through which a person can pass, such as a hall door, a room door, or a window. Positional coordinates of an entrance in an indoor space may be initially set in advance in the robot system 300. In this case, the entrance identifying unit 400 identifies an entrance based on positional coordinate information. Also, the entrance identifying unit 400 may recognize a variable wall whose state changes owing to opening and closing, or which is normally a wall but through which a moving object such as a user can pass, as an "entrance" from an image.

The existence determining unit 402 determines whether or not there is a user in a vicinity of an entrance identified by the entrance identifying unit 400. An "identified entrance" in this case need not be an actual entrance. It is sufficient that the "identified entrance" is a place recognized as an entrance by the robot 100. The existence determining unit 402 determines that there is a user in a vicinity of an entrance when a user is recognized by image within a predetermined range from the entrance, for example, within a range of one meter or less, by various kinds of sensor such as the highly directional microphone or the camera. Actually, an effect equivalent to the monitoring area 150 being set in a periphery of an entrance is obtained. When the external sensor 114 is installed in an entrance vicinity, the existence determining unit 402 may determine that a person is in the entrance vicinity from a detection signal from the external sensor 114.

The path predicting unit 404 determines whether or not a user moving toward an entrance exists. The path predicting unit 404 tracks and monitors a position of a user in a periphery of the robot 100, and determines whether or not any user is heading in a direction of an entrance. In at least one embodiment, the path predicting unit 404 determines whether or not any user has entered within a predetermined range from an entrance. When the external sensor 114 is installed in an entrance vicinity, the path predicting unit 404 may determine whether or not a user moving toward an entrance exists from a detection signal from the external sensor 114.

Figure 9:
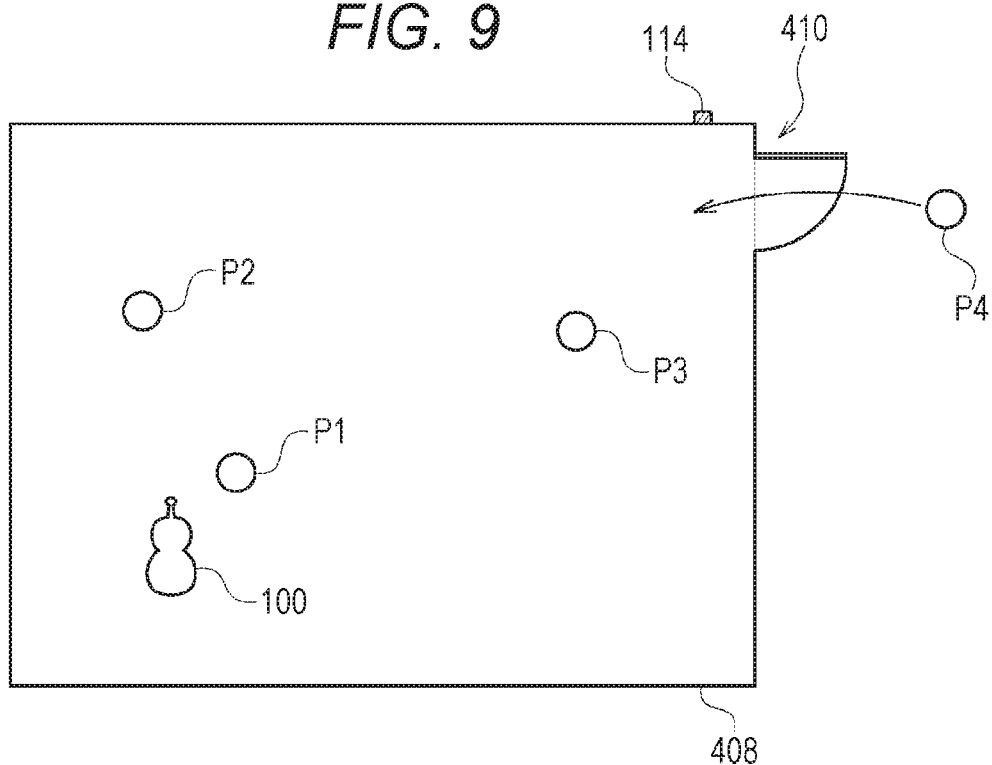
FIG. 9 is a schematic view for describing an action of the robot when a user enters from an entrance according to at least one embodiment.

FIG. 9 is a schematic view for describing an action of the robot 100 when a user enters from an entrance.

An indoor space 408 is a closed space recognized by the robot 100 using various kinds of sensor. The indoor space 408 may be an indoor room, or may be a house. In at least one embodiment, the robot 100 has already identified a position of an entrance 410 using the entrance identifying unit 400. FIG. 9 shows a situation in which users P1 to P3 exist in an interior of the indoor space 408, and a user P4 newly enters from the entrance 410. The external sensor 114 is installed on a wall near the entrance 410.

The existence determining unit 402 of the robot 100 regularly monitors whether or not a user exists in a region peripheral to the entrance 410, for example, in a range within, e.g., one meter, from the entrance 410, by filming an image of the periphery of the entrance 410. When the external sensor 114 is installed, the existence determining unit 402 monitors using a detection signal from the external sensor 114, and when the external sensor 114 is not installed by the entrance 410, the existence determining unit 402 monitors the existence or otherwise of a user by regularly checking an image of the periphery of the entrance 410. The robot 100, by including a camera that can film the periphery, such as an omnidirectional camera or a half-celestial sphere camera, as a camera, can film an image of the periphery of the entrance 410 and detect a change in conditions, even when the entrance 410 is positioned on a rear side of the robot 100. A "change in conditions" in this case may be an occurrence of a situation differing from a steady state, such as a detection of a moving object passing through a vicinity of the entrance 410, a detection of speech, or a temperature change.

In response to a determination that the user P4 exists in the region peripheral to the entrance 410, the movement determining unit 138 sets the direction in which the entrance 410 exists as a movement destination. According to this kind of control method, a "greeting" or "seeing off" by the robot 100 can be realized by action when the user P4 passes through the entrance 410.

The existence determining unit 402 of the robot 100 may also determine that a user exists in the periphery of the entrance 410 when speech from the direction of the entrance 410 is detected by a speech detector with directivity, such as a microphone array. As a microphone array includes a multiple of microphones, not only can speech be detected, but the direction of the speech source can also be identified. For example, when a sound of unlocking the entrance 410 is detected, the robot 100 may move in the direction of the entrance 410.

The existence determining unit 402 may determine that there is a user in the periphery of the entrance 410 when a specific keyword is detected in speech. In at least one embodiment, the specific keyword is a typical expression spoken together with a return home or a departure, such as "I'm home", "Hiya", "Have a good day", "See you", "See you later", or "Come here". Typical words spoken by a user or a peripheral human when the user goes out or returns home are registered in advance as "specific speech" in a database such as the server 200. When specific speech is detected, the robot 100 may head toward a point at which the specific speech is spoken.

When the user P4 newly appears in the vicinity of the entrance 410 in a situation in which the multiple of users P1 to P3 exist in the indoor space 408, one of the users P1 to P3 might move in the direction of the entrance 410 in order to greet the user P4. In at least one embodiment, the users P1 and P2 greet the user P4. The robot 100, rather than leading the users P1 and P2 who are heading to greet the user P4, may head for the entrance 410 behind the two users. According to this kind of control method, an action such that the robot 100, while having an interest in the user P4 who newly appears in the indoor space 408, approaches the user P4 hidden behind the other users P1 and P2 can be realized. According to this kind of action, "timidity" and "curiosity" of the robot 100 can be expressed.

The person recognizing unit 214 determines whether the newly appearing user P4 is a known user, in other words, whether the user P4 is already registered in the database. For example, when behavioral or physical characteristics of the user P4 correspond to any user characteristic information (profile) already registered, the user P4 is an "already-known user".

When the user P4 possesses a mobile terminal that can vocalize user ID, the person recognizing unit 214 determines whether or not the user P4 is an already-known user in accordance with whether or not the user ID is already registered.

The robot 100 changes an action aspect in accordance with whether or not the user P4 is a known user (an already-registered user). When the user P4 is an already-known user, the action determining unit 140 may express by action a "welcoming intention" via an action such as waving the arm 106, nodding the head, or increasing an approach speed. Conversely, when the user P4 is an unknown user, the robot 100 may adopt an avoiding action such as aborting the greeting and maintaining distance from the user P4, stopping on the spot, or hiding behind another already-known user.

A situation wherein users registered in (recognized by) the robot 100 are the four users P1 to P4, and the four people are in the room, is envisaged. When a new person is detected in this case, in at least one embodiment, the robot 100 determines with 100% probability that the person is an unknown "visitor". When a new person is detected when the users P1 to P3 are in the room, the person might be the user P4, or might be an unknown "visitor". The person recognizing unit 214 or the movement determining unit 138 determines that the probability of the new person being a visitor is 50%. When a new person is detected when the users P1 and P2 are in the room, the person is the user P3 or P4, or an unknown "visitor". The person recognizing unit 214 or the movement determining unit 138 determines that the probability of the new person being a visitor is 33%. According to the heretofore described determination method, the robot 100 may perform a "hesitant greeting" by following a user heading to greet a new person only when the probability of the new person being a visitor is equal to or greater than a predetermined threshold.

The robot 100 or the server 200 may include a lifestyle pattern accumulating unit in which user lifestyle patterns are accumulated. Alternatively, the communication unit 142 of the robot 100 may acquire lifestyle pattern information of each user as appropriate by accessing a lifestyle pattern accumulating unit formed as an external database. Times at which a user gets up, goes out in order to go to work or the like, returns home, and goes to bed are registered as lifestyle pattern information for each user in the lifestyle pattern accumulating unit. As there is normally variation in these times, average values and mode values of the times may be registered as representative values. Multiple kinds of lifestyle pattern data may be registered not only for each user, but also for each day and season.

The existence determining unit 402 may refer to user's lifestyle pattern information, and predict a time at which the user will return home. When the time at which the user is predicted to return home approaches, the movement determining unit 138 may cause the robot 100 to move in the direction of the entrance 410, and "greet" the user in advance. According to this kind of control method, greeting is easily realized with high accuracy. Alternatively, the robot 100 need not perform a greeting when the time at which the user returns home is not near.

Figure 10:
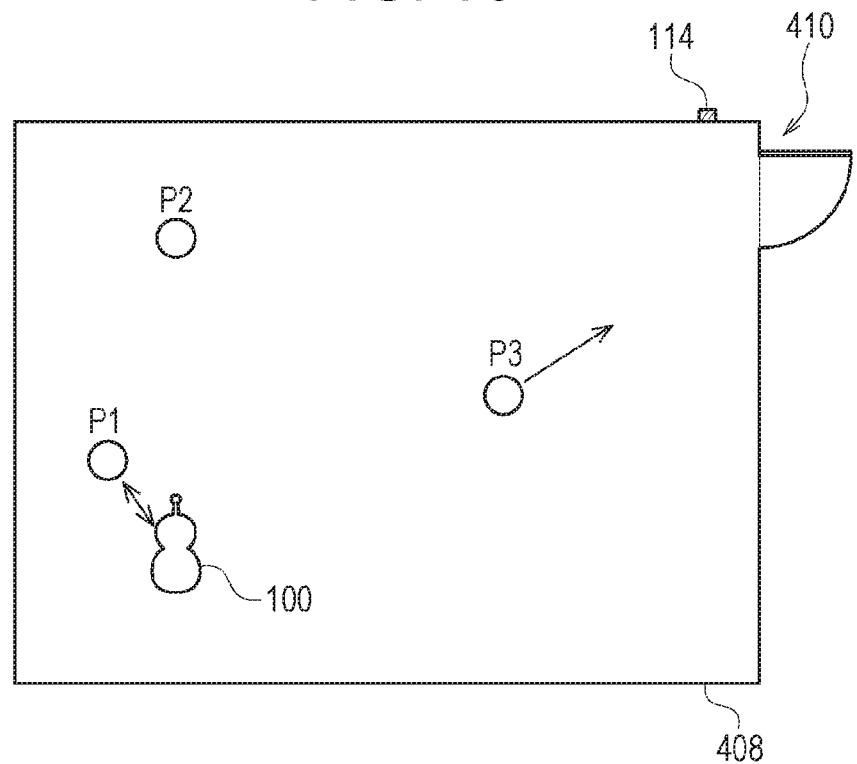
FIG. 10 is a schematic view for describing an action of the robot when a user leaves from an entrance according to at least one embodiment.

FIG. 10 is a schematic view for describing an action of the robot 100 when a user leaves from an entrance.

The robot 100 regularly recognizes positions and directions of movement of the users P1 to P3 in the indoor space 408. Herein, in at least one embodiment, the user P3 starts to move toward the entrance 410. The path predicting unit 404 determines whether or not the user P3 is moving toward the entrance 410. Specifically, when the direction of movement of the user P3 is one aiming for the entrance 410, and that kind of movement continues for a predetermined time or longer, the path predicting unit 404 determines that the user P3 is passing through the entrance 410 and about to leave the indoor space 408.

In response to a determination that the user P3 is moving toward the entrance 410, the movement determining unit 138 controls the drive mechanism 120 so that the robot 100 moves following the user P3. According to this kind of control method, a "seeing off" by the robot 100 can be realized by action when the user P3 passes through the entrance 410.

The movement determining unit 138 may forbid the robot 100 from passing through the entrance 410. That is, the movement determining unit 138 may restrict movement so that the robot 100 does not leave the indoor space 408 by arranging so that the robot 100 moves as far as the vicinity of the entrance 410 in the indoor space 408, but does not follow a user any further. Also, it may be arranged that the robot 100 gives up on passing through the entrance 410 with a specific keyword such as "Wait", "No further", or "See you" being spoken as a condition.

The path predicting unit 404 may refer to user's lifestyle pattern information, and predict a time at which the user will leave home. When the user P3 actually moves in a direction toward the entrance 410 in a time range including the time at which the user P3 is predicted to leave home, the movement determining unit 138 may cause the robot 100 to move in the direction of the entrance 410 and "see off" the user. For example, when the time at which the user P3 is predicted to leave home is 7 o'clock in the evening, one hour before and after that, which is 6.30 to 7.30, is set as a preparation time range for a seeing off, and the user P3 is monitored with priority in the preparation time range. Specifically, settings such as increasing the frequency of detecting the position of the user P3, and regularly directing the camera at the user P3, are carried out. According to this kind of control method, rather than performing a seeing off action every time a user passes through the entrance 410, a seeing off action is easily effectively performed at a timing at which a possibility of going out is high.

The robot 100 may perform a "seeing off" or a "greeting" with respect to another user when performing a predetermined communication action with respect to the user P1. In at least one embodiment, a communication action in this case is an action expressing interest or attention toward the user P1, such as being hugged by the user P1, staring at the user P1, or circling in the vicinity of the user P1.

When the existence of the user P4 is identified within a predetermined range from the entrance 410 when the robot 100 is performing a communication action with respect to the user P1, or when the external sensor 114 installed in the vicinity of the entrance 410 detects a proximity of the user P4, the movement determining unit 138 and the action determining unit 140 may abort the communication action, and the movement determining unit 138 cause the robot 100 to perform an action of greeting the user P4. With the user P4 being an already-known user, familiarity toward the user P4 being of a predetermined threshold or greater, familiarity toward the user P4 being equal to or greater than familiarity toward the user P1, or the like, as a condition, a communication action with respect to the user P1 may be interrupted.

Also, when the user P3 heads toward the entrance 410 when the robot 100 is performing a communication action with respect to the user P1, the communication action may be aborted, and the movement determining unit 138 cause the robot 100 to see off the user P3. With the user P3 being an already-known user, familiarity toward the user P3 being of a predetermined threshold or greater, familiarity toward the user P3 being equal to or greater than familiarity toward the user P1, or the like, as a condition, a communication action with respect to the user P1 may be interrupted.

When a new user enters a recognizable spatial region in the periphery of the robot 100, the robot 100 may move in the direction in which the user is. A "recognizable spatial region" in this case is a range in which an object can be recognized as a "person" by the incorporated camera. Alternatively, a "recognizable spatial region" may be a range in which not only can an object be recognized as a "person" by the incorporated camera, but also it can be recognized from an image whether or not the user recognized as a person is an already-known user. According to this kind of control method, a range the robot 100 can recognize is set to be just like a "territory", and the robot 100 can perform an action as though approaching with interest a user who enters the territory. The size of the recognizable spatial region depends on the performance and image processing capability of the camera incorporated in the robot 100. Because of this, "eyesight" of the robot 100 can actually be represented by the size of the recognizable spatial region.

In addition to this, when a new user enters a spatial region into which the robot 100 can move, the robot 100 may move in the direction in which the user is. In at least one embodiment, the robot 100 is designed with indoor action as a precondition. The robot 100 may be able to move over the whole of the inside of a home, or a room into which entrance is prohibited, such as a bathroom or a bedroom, may be designed. In this way, a range within which the robot 100 can move is set in advance. When recognizing that a new user exists in the range within which the robot 100 can move, the robot 100 may move beside the user. In this case too, the robot 100 can perform an action exactly as though the robot 100 has a territory.

A gesture of the robot 100 directing a pupil image toward a user, in other words, a gesture of the robot 100 directing a line of sight toward a user, may be defined as one kind of "affectionate gesture". A gesture of the robot 100 directing the head portion or the body 104 toward a user may be defined as one kind of "affectionate gesture". Using a gesture of directing the eye 110 or the body 104 toward a user in this way, the robot 100 may express the fact that the robot 100 is interested in the user. Generally, when a person shows goodwill toward another person, the person performs an action such as directing a line of sight toward the other person, watching the other person closely, opening the eyes wide, or shifting a stance (directing the head or body). The robot 100 can also express affection in the same way as a human by directing the pupil image toward a user, maintaining that state for a predetermined time, for example, 1.0 second or more, widening the pupil image, or directing the head or body toward the user, and this kind of gesture may be defined as an affectionate gesture indicating goodwill toward a person.

Moving to follow a user, moving the head up and down when being hugged, moving the neck so as to bring the face nearer the user when being hugged, shaking the body 104 in a position of being hugged, rotating, moving the arm 106 like a penguin, and the like, are conceivable as other affectionate gestures.

A lifestyle pattern may be set by a user. Alternatively, the robot 100 may detect the time at which a user gets up, or the like, by observing the user's actions. For example, the robot 100 may identify the time at which a user A gets up by registering the time at which the user A leaves a bedroom in the lifestyle pattern accumulating unit. The time at which the user A gets up is registered as a lifestyle pattern by the recognizing unit 156 of the robot 100 recognizing that the user A has got up using the camera or the like, and the communication unit 142 registering the time at which the user A gets up in the data storage unit 148 or an external database.

In at least one embodiment, the mode value of a time at which the user A leaves home is 7.50 in the morning. The robot 100 looks for the user A, and tracks the user A, at 7.40, which is ten minutes before 7.50. When the user A moves to the monitoring area 150 (or the vicinity of the entrance 410), the robot 100 follows the user A and heads toward the monitoring area 150. According to this kind of predictive action based on lifestyle pattern information, the robot 100 more reliably sees off the user A easily. The robot 100 may refer to lifestyle pattern information, predict a time at which a user is due to go out (a mode value, an average value, and the like), and start an action of tracking the user a predetermined time before the time at which the user is due to go out. Further, the robot 100 may perform a "seeing off" by performing an affectionate gesture when the user enters the monitoring area 150 of the hall 152, when specific speech is detected, or when the user opens the door of the hall 152. As with a greeting, the robot 100 need not perform a "seeing off" until the predetermined time before the time at which the user is due to go out.

In the same way, in at least one embodiment, the mode value of a time at which the user A returns home is 8.20 in the evening. The robot 100 may move to the monitoring area at 8 o'clock, which is 20 minutes before 8.20, and await the return home of the user A. Alternatively, the robot 100 may be positioned within a range in which the sound of the door of the monitoring area 150 being unlocked can be detected, and wait to greet the user A. In this way, the robot 100 may refer to lifestyle pattern information, predict a time at which a user is due to return home (a mode value, an average value, and the like), and move to a predetermined area in the vicinity of the monitoring area 150 a predetermined time before the time at which the user is due to return home. Further, the robot 100 may perform a "greeting" by performing an affectionate gesture when the user enters the monitoring area 150 of the hall 152, when a specific keyword is detected, or when the user opens the door of the hall 152.

The external sensor 114 installed in the hall 152 detects an entrance of a user into the monitoring area 150, and notifies the server 200. The server 200 transmits a control signal instructing the robot 100 to perform a "greeting" or a "seeing off", and the robot 100 moves to a target point specified by the server 200. On reaching the target point, the robot 100 performs an affectionate gesture with respect to a user.

When a user passing through a doorway is confirmed using the incorporated camera, the recognizing unit 156 of the robot 100 may proactively cause the robot 100 to perform a greeting or seeing off action without waiting for an instruction from the server 200. When the external sensor 114 installed near the door detects a user passing through the doorway, the external sensor 114 may transmit a detection signal to the server 200, and the server 200 instruct the robot 100 to perform a greeting or the like. Alternatively, a proximity detection signal may be transmitted from the external sensor 114 to the robot 100, and the movement determining unit 138 of the robot 100 may set a movement target point in the direction in which a door corresponding to ID of the external sensor 114 exists. When the recognizing unit 156 recognizes a user from an image using the camera after the robot 100 reaches the movement target point, the robot 100 performs an affectionate gesture.

When the sound of a door opening and closing is detected by the incorporated microphone (sensor) or a microphone incorporated in the external sensor 114, the robot 100 may move to the door, and perform an affectionate gesture when a user is recognized from an image. The robot 100 may perform a greeting or the like not only when a user passes through a doorway, but also when there is a situation in which a user passing through is foreseen, like a door opening and closing.

In addition to a user entering the monitoring area 150 or a door opening and closing, specific speech such as "I'm home", "Hiya", "Have a good day", "See you", "See you later", or "Come here" may be detected as a method of detecting a "situation in which a greeting or seeing off should be performed". Typical words spoken when a user goes out or returns home by the user or a peripheral human are registered in advance as "specific speech" in the database of the server 200 or the like. When specific speech is detected, the robot 100 may head to a point at which the specific speech is spoken, and perform an affectionate gesture with respect to a user.

When detecting specific speech, the robot 100 may move to the source of the specific speech and perform an affectionate gesture, with a user being recognized from an image as a trigger. Which of the multiple kinds of affectionate gesture is to be performed may be selected at random, or the affectionate gesture may be selected in accordance with a variable such as familiarity toward the user or an emotion parameter.

When multiple robots 100 exist, one robot 100 may notify another robot 100 of a "return home" or a "going out". For example, when the first robot 100 detects a sound of the door of the hall 152 being opened and closed or being unlocked, the first robot 100 notifies the second robot 100 by wireless communication of the opening and closing sound being detected. When the first robot 100 recognizes a return home of a user by detecting an opening and closing sound, or the like, not only does the first robot 100 perform a greeting action, but by notifying the second robot 100 of the detection of the return home, the second robot 100, which has not detected the return home, can also perform a greeting action. The second robot 100, even when in a place far from the hall 152 and unable to detect an opening and closing sound or an unlocking sound, can perform a greeting action or the like in the same way as the first robot 100.

More specifically, when detecting the existence of a person in the hall 152, the first robot 100 sets the hall 152 as a movement destination target point, and performs an affectionate gesture when reaching the target point. Also, when detecting the existence of a person in the hall 152, the first robot 100 transmits a detection signal to the second robot 100. When receiving the detection signal, the second robot 100 sets the hall 152 as a movement destination target point, and performs an affectionate gesture when reaching the target point, in the same way as the first robot 100. The same applies to a seeing off. The first robot 100 may transmit a detection signal to the second robot 100 in the same way when detecting an opening and closing of a door, when detecting a person passing through a doorway, or when detecting specific speech.

The robot 100 may change an action in accordance with familiarity. For example, when the other user S2 going out or returning home is detected in a situation in which the robot 100 is being hugged by the user S1, the robot 100 compares familiarity toward the user S1 and familiarity toward the user S2, and gives priority to an action with respect to the user with the higher familiarity. The same applies when the other user S2 going out or returning home is detected when the robot 100 is beckoned by the user S1. When a second user enters the monitoring area 150 of the hall 152, or when specific speech spoken by the second user is detected, that is, when a return home of the second user is recognized, the robot 100 may perform a greeting action or a seeing off action with familiarity toward the second user being greater than familiarity toward a first user, who is at home, as a condition.

When the robot 100 is performing an action instructed by the first user, or when the second user returns home when the robot 100 is in contact with the first user, the robot 100 may change an affectionate gesture in accordance with a difference between familiarity toward the first user and familiarity toward the second user. For example, when the second user who is far more familiar than the first user (the difference is equal to or greater than a first threshold) returns home, the robot 100 may separate from the first user, move to the hall 152, and ask the second user for a hug. When the second user who is of the same degree of familiarity as the first user (the difference is equal to or greater than a second threshold, and less than the first threshold) returns home, the robot 100 may move once to the hall 152, stare at the second user, then return to the place where the first user is. Furthermore, when the second user who is not as familiar as the first user (the difference is less than the second threshold) returns home, the robot 100 need not perform an affectionate gesture with respect to the second user.

The robot 100 cannot pass through the doorway of the hall 152, but can pass through an indoor doorway. Also, an indoor doorway through which the robot 100 cannot pass may be set. The server 200 may register positions of a doorway that can be passed through and a doorway that cannot be passed through on a map, and a range within which the robot 100 can move may be limited in accordance with the map. A user may be able to prohibit the robot 100 from passing through an indoor doorway by vocalizing predetermined speech such as "Wait" (hereafter called "waiting speech"). When a user vocalizes waiting speech such as "Wait", "Don't come", or "Stop there" when the robot 100 is about to pass through an indoor doorway and follow the user, the robot 100 may stop without passing through the indoor doorway. Also, the robot 100 may learn that a door through which passing is prohibited by waiting speech cannot be passed through in future either. According to this kind of control method, a range within which the robot 100 can act can be controlled by waiting speech.

In addition to a sound of the door of the hall 152 being unlocked or opened and closed, the recognizing unit 156 of the robot 100 may detect a return home of a user by detecting a sound of an intercom or a melody set to play when the door of the hall 152 is opened. Also, the robot 100 may determine that a return home is possible from a conversation between users who are at home. For example, when the recognizing unit 156 of the robot 100 recognizes specific speech such as "Come" or "Come home" in a conversation between people at home, the recognizing unit 156 may determine that the return home of a user who is out is near. In this case, the robot 100 may move immediately to the hall 152, and set a predetermined point at which a sound of the hall 152 being unlocked can be detected as a movement target point.

When a visitor is detected from the sound of an intercom or the like when all owners are at home, the robot 100 may follow an owner, and hesitantly perform a greeting. For example, the robot 100 may follow an owner, and immediately withdraw into a living room without performing an affectionate gesture.

When there is an obstacle between a movement target point and the current point when the robot 100 performs a greeting or a seeing off, for example, when the robot 100 cannot reach the hall 152 because the living room door is closed, the robot 100 may stop and wait before the obstacle, and perform an affectionate gesture at a stage of visually recognizing a user. For example, when a route to the hall 152 is closed off by a glass indoor door, the robot 100 may stop before the indoor door, and perform an affectionate gesture when visually recognizing a user returning home through the glass. In this way, rather than a point like the hall 152 at which a user exists, a movement destination point may be a point set on a route toward the point at which the user exists.

When a user passes through an indoor door, the robot 100 may refer to lifestyle pattern information, and determine whether the user is leaving long-term or temporarily. Further, the robot 100 may perform a seeing off action only when the user is leaving long-term. For example, in at least one embodiment, a probability of the user B going out when passing through an indoor door between 9 o'clock and 10 o'clock in the morning (a first time range) is normally equal to or greater than a predetermined threshold, but when passing through the indoor door between 1 o'clock and 3 o'clock in the afternoon (a second time range), the probability of going out is lower than the predetermined threshold. The robot 100 does not perform a seeing off action when the time range in which the user B passes through the indoor door is the first time range, but performs a seeing off when the time range is the second time range.

Also, when detecting an object indicating going out, such as wearing a coat, wearing a hat, or carrying a thermos flask, the robot 100 may determine that the user is leaving long-term, and perform a seeing off action. The robot 100 may determine that the user is leaving long-term when the user passes through an indoor door, or when detecting specific speech such as "Have a good time" or "See you later".

The data processing unit 202 of the server 200 or the data processing unit 136 of the robot 100 may have an emotion managing unit. The emotion managing unit manages various emotion parameters indicating emotions (sadness, curiosity, a desire for approval, and the like) of the robot 100. These emotion parameters constantly fluctuate. The importance of the multiple of action maps changes in accordance with the emotion parameters, a movement target point of the robot 100 changes in accordance with the action maps, and the emotion parameters change in accordance with movement of the robot 100 and the passing of time.

For example, when the emotion parameter indicating sadness is high, the emotion managing unit sets the weighting coefficient of the action map that evaluates places in which the robot 100 feels at ease to be high. When the robot 100 reaches a point on the action map at which sadness can be eliminated, the emotion managing unit reduces the emotion parameter indicating sadness. Also, each kind of emotion parameter also changes in accordance with a response action to be described hereafter. For example, the emotion parameter indicating sadness decreases when the robot 100 is "hugged" by an owner, and the emotion parameter indicating sadness increases little by little when the robot 100 does not visually recognize an owner for a long time.

The robot 100 itself may install the external sensor 114. When the robot 100 is introduced into a home, the robot 100 may instruct a user on a place in which to install the external sensor 114, or the robot 100 itself may install the external sensor 114.

The above disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not dictate a relationship between the various embodiments and/or configurations discussed.

What is claimed is:

1. An autonomously acting robot, comprising:
   a processor configured to execute instructions for:
      determining a direction of movement,
      recognizing an external environment from information detected by a sensor,
      specifying a place through which a person can pass in an indoor space as an entrance, and
      determining an existence of a person within a predetermined range from the specified entrance, and
   a drive mechanism configured to execute a specified movement, wherein in response to, during an execution of a predetermined communication action with respect to a first user, a determination that the person exists within the predetermined range from the specified entrance, the processor is configured to interrupt the communication action and instruct the drive mechanism to move toward the specified entrance, wherein the communication action is a non-verbal communication action, wherein
   the processor is configured to predict a time at which a user will return home based on life pattern information of the user, and
   to instruct the drive mechanism to move toward the specified entrance a predetermined time before the predicted time at which the user will return home.

2. The autonomously acting robot according to claim 1, wherein
   the processor is configured to determine whether the person exists in the specific entrance in response to a signal from the sensor indicating a change in a state in a direction in which the specified entrance exists.

3. The autonomously acting robot according to claim 1, wherein
   the processor is configured to determine whether the person exists within the predetermined range from the specified entrance based on a signal from the sensor indicating detection of a specific keyword.

4. The autonomously acting robot according to claim 1, wherein
   the processor is configured to estimate a possibility of a visitor based on detection of the person in the indoor space, and instruct the drive mechanism to move toward the specified entrance in response to the detection of the person in the indoor space.

5. The autonomously acting robot according to claim 4, wherein the processor is further configured to change an action aspect during movement in response to a determination that the visitor is a previously registered user.

6. The autonomously acting robot according to claim 1, wherein
   the processor is configured to determine that the person exists in a periphery of the specified entrance in response to a signal from the sensor indicating that an object is approaching the indoor space.

7. The autonomously acting robot according to claim 1, wherein
   the processor is configured to:
   determine a second user is present; and
   interrupt the communication action with a first user in response to a determination that a familiarity with the second user is higher than a familiarity with the first user.

8. An autonomously acting robot, comprising:
   a processor configured to execute instructions for:
      determining a direction of movement,
      recognizing an external environment based on a signal from a sensor,
      specifying a place through which a person can pass in an indoor space as an entrance, and
      determining whether the person is moving in a direction toward the specified entrance; and
   a drive mechanism configured to execute a specified movement, wherein in response to a determination that, during an execution of a predetermined communication action with respect to a first user, a second user is moving in the direction toward the specified entrance, the processor is configured to interrupt the communication action and instruct the drive mechanism to move toward the specified entrance, wherein the communication action is a non-verbal communication action, wherein
   the processor is configured to predict a time at which a user will leave home based on life pattern information of the user, and
   to instruct the drive mechanism to avoid following the user toward the specified entrance outside a predetermined time period including the predicted time of leaving home.

9. The autonomously acting robot according to claim 8, wherein
   the processor is configured to prohibit, during instructing the drive mechanism to move toward the specified entrance, the drive mechanism moving the autonomously acting robot through the specified entrance.

10. The autonomously acting robot according to claim 8, wherein
    the processor is configured to prohibit, during instructing the drive mechanism to move toward the specified entrance, the drive mechanism from moving the autonomously acting robot through the specified entrance in response to receiving a signal indicating a specific keyword from the sensor.

11. The autonomously acting robot according to claim 8, wherein the processor is configured to interrupt the communication action in response to a determination that a familiarity with the second user is higher than a familiarity with the first user.

12. An autonomously acting robot, comprising:

a processor configured to execute instructions for:
determining a direction of movement, and
recognizing an external environment from information received from a sensor; and a drive mechanism configured to execute a specified movement, wherein in response to a determination that, during an execution of a predetermined communication action with respect to a first user, a second user exists the processor is configured to interrupt the communication action and instruct the drive mechanism to move in a direction in which the second user exists in response to a determination that a familiarity of the second user is greater than a familiarity of the first user, wherein the communication action is a non-verbal communication action.

13. The autonomously acting robot according to claim 12, wherein the processor is configured to instruct the drive mechanism to move in the direction toward the second user in response to a determination that the detected second user is previously registered in a memory connected to the processor.

14. The autonomously acting robot according to claim 12, wherein the processor is further configured to:
select a gesture from multiple gestures, and
to select a sitting action in response to the robot reaching a point at which the second user exists.

15. An autonomously acting robot, comprising:

a processor configured to execute instructions for:
determining a direction of movement,
recognizing an external environment based on a signal from a sensor,
specifying a place through which a person can pass in an indoor space as an entrance, and
determining whether the person is moving in a direction toward the specified entrance; and a drive mechanism configured to execute a specified movement, wherein in response to a determination that, during an execution of a predetermined communication action with respect to a first user, a second user is moving in the direction toward the specified entrance, the processor is configured to interrupt the communication action and instruct the drive mechanism to move toward the specified entrance, wherein the communication action is a non-verbal communication action, wherein the processor is configured to interrupt the communication action in response to a determination that a familiarity with the second user is higher than a familiarity with the first user.

\* \* \* \* \*